United States Patent [19]
Takeo

[11] Patent Number: 5,553,159
[45] Date of Patent: Sep. 3, 1996

[54] RADIATION IMAGE PROCESSING METHOD UTILIZING NEURAL NETWORKS

[75] Inventor: Hideya Takeo, Kanagawa-ken, Japan

[73] Assignee: Fuji Photo Film Co., Ltd., Kanagawa, Japan

[21] Appl. No.: 867,060

[22] Filed: Apr. 10, 1992

[30] Foreign Application Priority Data

Apr. 16, 1991 [JP] Japan .................................. 3-084160

[51] Int. Cl.$^6$ .......................................................... G06K 9/62
[52] U.S. Cl. ........................................ 382/156; 382/132
[58] Field of Search .................................. 382/14, 15, 6, 382/38, 36, 128, 131, 132, 155, 156, 157, 158, 159; 364/413.13, 413.14, 413.17, 43.19, 413.23; 395/2.11, 2.41, 2.68, 2.69, 21, 22, 23, 24, 25, 27

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,638,162 | 1/1987 | Tanaka et al. | 250/327.2 |
| 4,719,591 | 1/1988 | Hopfield et al. | 364/807 |
| 4,829,181 | 5/1989 | Shimura | 250/327.2 |
| 4,851,678 | 7/1989 | Adachi et al. | 250/327.2 |
| 4,903,310 | 2/1990 | Takeo et al. | 382/6 |
| 4,931,644 | 6/1990 | Adachi et al. | 250/327.2 |
| 4,933,872 | 6/1990 | Vandenberg et al. | 382/14 |
| 4,962,539 | 10/1990 | Takeo et al. | 382/9 |
| 4,967,079 | 10/1990 | Shimura | 250/327.2 |
| 5,042,074 | 8/1991 | Takeo et al. | 382/9 |
| 5,151,951 | 9/1992 | Ueda et al. | 382/14 |
| 5,220,618 | 6/1993 | Sirat et al. | 382/14 |
| 5,263,107 | 11/1993 | Ueda et al. | 382/14 |

FOREIGN PATENT DOCUMENTS

| | | |
|---|---|---|
| 56-11395 | 2/1981 | Japan . |
| 61-5193 | 2/1986 | Japan . |
| 61-280163 | 12/1986 | Japan . |
| 2275435 | 11/1990 | Japan . |
| 2277679 | 11/1990 | Japan . |
| 2272530 | 11/1990 | Japan . |
| 2275429 | 11/1990 | Japan . |
| 2275432 | 11/1990 | Japan . |
| 2296235 | 12/1990 | Japan . |
| 376534 | 11/1992 | Japan . |

OTHER PUBLICATIONS

Rumelhart et al, "Learning Internal Representations by Error Propagation", vol. 1., pp. 319–362, *Parallel Distributed Processing —Exploratins in the Microstructure of Cognition* (date unknown).

Aso, "Back–propagation", *Comutrol*, No. 24, pp. 53–60 (date unknown).

Rumelhart et al, "Learning Representations by Back–Propagation Errors", *Nature*, 323–9, 533–536, 1986.

Aihara, "Neural Computer", published by Tokyo Denki University (date unknown).

*Primary Examiner*—Leo Boudreau
*Assistant Examiner*—Phuoc Tran
*Attorney, Agent, or Firm*—Sughrue, Mion, Zinn, Macpeak & Seas

[57] ABSTRACT

In a radiation image processing method utilizing a neural network, an image signal representing a radiation image is fed into a neural network, image processing is carried out on the image signal by the neural network, and an output representing the results of the image processing is obtained from the neural network. Image processing, with respect to the whole region of the radiation image, is carried out on the image signal by a first group of neurons of an intermediate layer of the neural network. Image processing, with respect to parts of the region of the radiation image, is carried out on the image signal by a second group of neurons of the intermediate layer of the neural network. Regardless of set values of initial conditions, the output of the neural network becomes converged to a global minimum corresponding to the stored information, and the results of operation obtained from the neural network are not trapped at a local minimum.

7 Claims, 5 Drawing Sheets

RADIATION IMAGE PROCESSING METHOD UTILIZING NEURAL NETWORKS

BACKGROUND OF THE INVENTION

1. Field of the Invention

This invention relates to a radiation image processing method utilizing a neural network, wherein a subdivision pattern of radiation images, the shape and location of an irradiation field, an orientation in which an object was placed when the image of the object was recorded, a portion of an object of which the image was recorded, or the like, is determined from an image signal representing a radiation image by utilizing a neural network, and/or a filtering process, such as emphasis or correction, is carried out on an image signal representing a radiation image by utilizing a neural network.

The term "processing" as used hereinbelow means the determination of various items and the filtering process described above.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image, having good image quality with high contrast, high sharpness, high graininess, or the like, can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems, which use stimulable phosphor sheets, are advantageous over conventional radiography using silver halide photographic materials, in that images can be recorded even when the energy intensity of the radiation, to which the stimulable phosphor sheet is exposed, varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is carried out in order to approximately ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions", as used hereinafter, means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam", as used herein, means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (or the preliminary read-out image signal) obtained and to adjust the image processing conditions, which are to be used when the image signal is processed, on the basis of the results of an analysis of the image signal. The term "image processing conditions", as used herein, means a group of various factors, which are adjustable and set when an image signal is subjected to processing, which affects the gradation, sensitivity, or the like, of a visible image reproduced from the image signal. The proposed method is applicable to cases where an image signal is obtained from a radiation image recorded on a recording medium such as conventional X-ray film, as well as to systems using stimulable phosphor sheets.

As disclosed in, for example, Japanese Unexamined Patent Publication No. 61(1986)-280163 and U.S. Pat. No. 4,638,162, operations for calculating the values of the read-out conditions for the final readout and/or the image processing conditions are carried out by a group of algorithms which analyze an image signal (or a preliminary read-out image signal). A large number of image signals detected from a large number of radiation images are statistically processed. The algorithms which calculate the read-out conditions for the final readout and/or the image processing conditions are designed on the basis of the results obtained from this processing.

In general, the algorithms which have heretofore been employed are designed such that a probability density function of an image signal is created, and characteristic values are found from the probability density function. The characteristic values include, for example, the maximum value of the image signal, the minimum value of the image signal, or the value of the image signal at which the probability density function is maximum, i.e. the value which occurs most frequently. The read-out conditions for the final read-out and/or the image processing conditions are determined on the basis of the characteristic values.

However, in cases where the read-out conditions for the final readout and/or the image processing conditions are calculated on the basis of the results of an analysis of the image signal in the manner described above, and the image signal is detected from a recording medium, on which the irradiation field was limited during the recording of the radiation image, the radiation image cannot be ascertained accurately if the image signal is analyzed without the shape and location of the irradiation field being taken into consideration. As a result, incorrect read-out conditions and/or incorrect image processing conditions are set, and it becomes impossible to reproduce a visible radiation image which has good image quality and can serve as an effective tool in, particularly, the efficient and accurate diagnosis of an illness.

In order to eliminate the aforesaid problem, it is necessary to determine the shape and location of an irradiation field and then to calculate the read-out conditions for the final readout, and/or the image processing conditions, on the basis of only the image signal representing image information stored in the region inside of the irradiation field.

The applicant has proposed various methods for determining the shape and location of an irradiation field as disclosed in, for example, U.S. Pat. Nos. 4,967,079, 4,851, 678 and 4,931,644. The aforesaid problems can be eliminated by automatically determining the shape and location of the irradiation field by use of the proposed methods, and setting the read-out conditions for the final readout, and/or the image processing conditions, only for the region inside of the irradiation field thus found.

When radiation images are recorded on recording media, subdivision image recording is often carried out. With the subdivision image recording, the recording region on a single recording medium is divided into a plurality of predetermined subdivisions, and the respective subdivisions are exposed to radiation for image recording. The subdivision image recording is economical since, for example, when images of small object portions are recorded on large recording media, images of a plurality of object portions can be recorded on a single recording medium. Also, the speed with which radiation images are recorded and read out can be kept high.

However, in cases where irradiation fields are limited when the subdivision image recording described above is carried out on a single recording medium, the respective irradiation fields become separated from each other on the recording medium. In such cases, the shapes and locations of the irradiation fields cannot be determined accurately. A method for automatically determining the shapes and locations of a plurality of irradiation fields on a single recording medium has also been proposed. However, with the proposed method, the algorithms for determining the shapes and locations of irradiation fields become very complicated, and a very expensive apparatus is necessary for carrying out the method.

If information concerning the positions of the respective subdivisions is given by manually entering the information representing a subdivision pattern on the recording medium into an apparatus for determining the shape and location of an irradiation field when the shapes and locations of the irradiation fields are to be detected, an operation for detecting a single irradiation field in each subdivision may be carried out. Therefore, the problems in which the algorithms for determining the shapes and locations of the irradiation fields become very complicated can be eliminated. However, considerable time and labor are required to enter the information concerning the subdivision pattern each time radiation images are read out from a recording medium.

Accordingly, a need exists for a method with which a subdivision pattern of radiation images recorded on a recording medium can be determined automatically. The applicant proposed various methods for automatically determining a subdivision pattern of radiation images which have been recorded on a recording medium in, for example, U.S. Pat. Nos. 4,829,181, 4,962,539, and 5,042,074, and Japanese Unexamined Patent Publication Nos. 2(1990)-267679, 2(1990)-272530, 2(1990)-275429, 2(1990)-275432, 2(1990)-275435 and 2(1990)-296235.

Also, in cases where the read-out conditions for the final readout, and/or the image processing conditions, are determined in the manner described above, it often occurs that, when radiation images of a single object were recorded on recording media with the object being placed in different orientations, the image density of a region of interest in the object varies for visible images reproduced from the radiation images.

For example, when the thoracic vertebrae of a human body are to be diagnosed, radiation images of the chest of the human body are recorded on stimulable phosphor sheets from the front and a side of the chest. In cases where the radiation image of the chest is recorded from the front of the chest, the thoracic vertebrae, which are the region of interest, overlap the mediastinum region, through which the radiation cannot pass easily. Therefore, in such cases, the amount of energy stored on part of the stimulable phosphor sheet corresponding to the thoracic vertebrae during its exposure to the radiation is comparatively small. As a result, when the stimulable phosphor sheet, on which the frontal chest image has been stored, is exposed to stimulating rays during the operation for reading out the radiation image, the part of the stimulable phosphor sheet corresponding to the thoracic vertebrae emits a comparatively small amount of light. On the other hand, in cases where the radiation image of the chest is recorded from the side of the chest, the thoracic vertebrae, which are the region of interest, overlap the lung fields, through which the radiation can pass easily. Therefore, in such cases, the amount of energy stored on part of the stimulable phosphor sheet corresponding to the thoracic vertebrae during its exposure to the radiation is comparatively large. As a result, when the stimulable phosphor sheet, on which the lateral chest image has been stored, is exposed to stimulating rays during the operation for reading out the radiation image, the part of the stimulable phosphor sheet corresponding to the thoracic vertebrae emits a comparatively large amount of light. Also, the maximum value and the minimum value of the image signal detected from the stimulable phosphor sheet do not vary much for the frontal chest image and the lateral chest image. Therefore, when the read-out conditions for the final readout, and/or the image processing conditions, are adjusted with conventional techniques in accordance with the maximum value and the minimum value of the image signal detected from the stimulable phosphor sheet, approximately the same values of the read-out conditions for the final readout, and/or approximately the same values of the image processing conditions, are set for the frontal chest image and the lateral chest image. Accordingly, if image signals are detected from the frontal chest image and the lateral chest image under the thus set read-out conditions for the final readout, and visible images are reproduced from the detected image signals, and/or if the image signals detected from the frontal chest image and the lateral chest image are processed under the thus set image processing conditions, and visible images are reproduced from the processed image signals, the image density of the patterns of the thoracic vertebrae in the visible image reproduced from the frontal chest image becomes comparatively low, and the image density of the patterns of the thoracic vertebrae in the visible image reproduced from the lateral chest image becomes comparatively high.

In order for the aforesaid problems to be eliminated, information concerning in what orientation the object was placed when the image of the object was recorded has heretofore been entered into an image read-out apparatus or an image processing unit each time the radiation image is read out from a stimulable phosphor sheet. The read-out conditions for the final readout, and/or the image processing conditions, are set in accordance with the entered information concerning the orientation in which the object was placed when the image of the object was recorded.

However, considerable time and labor are required to enter the information concerning the orientation, in which the object was placed when the image of the object was recorded, each time a radiation image is read out from a stimulable phosphor sheet. Also, it will easily occur that incorrect information concerning the orientation, in which the object was placed when the image of the object was recorded, is entered.

Therefore, a method for automatically determining the orientation, in which the object was placed when the medical image of the object was recorded on a stimulable phosphor sheet, or the like, has been proposed in, for example, U.S. Pat. No. 4,903,310.

Additionally, for the same reasons as those described above, in cases where the read-out conditions for the final readout, and/or the image processing conditions, are determined in the manner described above, it often occurs that the image density of a region of interest in an object varies in a reproduced visible image, depending on which portion of the object was recorded (e.g., the head, the neck, the chest, or the abdomen in cases where the object is a human body). In order for such problems to be eliminated, information concerning which portion of the object was recorded has heretofore been entered into an image read-out apparatus or an image processing unit each time the radiation image is read out from a stimulable phosphor sheet. The read-out conditions for the final readout, and/or the image processing conditions, are set in accordance with the entered information concerning the portion of the object of which an image was recorded.

As described above, when the read-out conditions for the final readout, and/or the image processing conditions, are set, it is necessary to determine a subdivision pattern of radiation images, the shape and location of an irradiation field, an orientation in which an object was placed when the image of the object was recorded, a portion of an object of which an image was recorded, or the like. A correction should then be made in accordance with the results of the determination. Thereafter, appropriate read-out conditions for the final readout, and/or appropriate image processing conditions, should be set.

With the aforesaid methods for determining the shape and location of an irradiation field, in cases where the contour (i.e. the edge) of the irradiation field is unsharp, the shape and location of the irradiation field cannot be determined accurately.

Also, even if an irradiation field is limited on a recording medium by using a mask, scattered radiation will turn to the side of the mask and will impinge upon the region outside of the irradiation field. As a result, density fog occurs in the region outside of the irradiation field on the recording medium. In such cases, the shape and location of the irradiation field cannot be determined accurately with the aforesaid methods for determining the shape and location of an irradiation field.

In order for the problems described above to be solved, before the shape and location of an irradiation field are determined, image emphasis may be carried out such that the edge of the irradiation field may be emphasized and adverse effects of the scattered radiation in the region outside of the irradiation field may be eliminated. Also, in cases where a remark portion is present at part of a radiation image, a filtering process may be carried out only on image signal components representing image information stored at said part of the radiation image in order to emphasize said part of the radiation image.

Additionally, in cases where defects, such as missing points, are present in an image signal which has been obtained from signal compression processing, or the like, an image correction utilizing a filtering process is carried out on the image signal in order to eliminate the defects.

Further, an image correction utilizing a filtering process, such as an image smoothing process or an image noise eliminating process, is carried out on an image signal representing a radiation image in order to improve the image quality of the radiation image.

As described above, during image processing on a radiation image, various filtering processes, such as emphasis and correction, are carried out on the image signal representing the radiation image such that an appropriate visible image may be reproduced.

Recently, a method for utilizing a neural network has been proposed and is being used in various fields.

The neural network is provided with a learning function by a back propagation method. Specifically, when information (an instructor signal), which represents whether an output signal obtained when an input signal is given is or is not correct, is fed into the neural network, the weights of connections between units in the neural network (i.e. the weights of synapse connections) are corrected. By repeating the learning operation of the neural network, the probability that a correct answer will be obtained in response to a new input signal can be kept high. (Such functions are described in, for example, "Learning representations by back-propagating errors" by D. E. Rumelhart, G. E. Hinton and R. J. Williams, Nature, 323–9,533–536, 1986a; "Back-propagation" by Hideki Aso, Computrol, No. 24, pp. 53–60; and "Neural Computer" by Kazuyuki Aihara, the publishing bureau of Tokyo Denki University).

By feeding an image signal representing a radiation image into the neural network, the determination of various items and various filtering processes described above can be carried out with the neural network. A correction can then be made in accordance with the results of the processing. Thereafter, appropriate read-out conditions for the final readout and/or appropriate image processing conditions can be set.

Specifically, when the determination of various items and various filtering processes are to be carried out, an image signal representing a radiation image is fed into the neural network. From the neural network, outputs representing characteristic measures, which indicate the results of the processing, are obtained. By repeating the learning operation of the neural network, outputs more accurately representing the characteristic measures can be obtained.

When the determination of various items, such as a subdivision pattern of radiation images, the shape and location of an irradiation field, an orientation in which an object was placed when the image of the object was recorded, and a portion of an object, the image of which was recorded, and/or a filtering process, such as emphasis or correction, is carried out by utilizing a neural network, outputs representing the characteristic measures, which indicate the results of the determination and/or the results of the filtering process, can be obtained from the neural network only by feeding an image signal, made up of a series of image signal components representing the picture elements in the radiation image, into the neural network. Therefore, various types of accurate processing can be carried out easily.

The applicant has proposed several methods for carrying out the determination of various items and a filtering process by utilizing a neural network. Such methods are proposed in, for example, U.S. patent application Ser. No. 687,140, now abandoned, and Japanese Patent Application No. 3(1991)-76534.

In Japanese Patent Application No. 3(1991)-76534, and U.S. patent application Ser. No. 687,140, now abandoned, an overall connection type of neural network is described.

Specifically, in cases where the neural network is composed of an input layer (a first layer), an intermediate layer (a second layer), and an output layer (a third layer), the image signal components corresponding to the whole region of an original image are fed into each of the neurons of the intermediate layer (i.e. the second layer). Such neural network is herein referred to as the overall connection type of neural network.

The learning operation of a neural network is carried out with respect to a given subject such that the difference between the output and a correct answer becomes smallest. In the overall connection type of neural network described above, the degree of freedom of the learning operation becomes very high. Therefore, depending on the set values of the initial conditions, the output of the neural network does not converge to the value resulting from the stable state of the neural network, i.e. to the global minimum, which is the minimum value of energy E. But instead, the output of the neural network is trapped at the local minimum of a shallow concave part, at which energy E locally takes the minimum value.

In general, the operation means of the neural network takes on the form of a black box, and no person can intervene in the operation means. Therefore, if the output of the neural network is trapped at the local minimum, a value, which is markedly different from the correct answer, is obtained as the output from the neural network.

SUMMARY OF THE INVENTION

The primary object of the present invention is to provide a radiation image processing method utilizing a neural network wherein, regardless of set values of initial conditions, the output of a neural network is converged to a minimum point (i.e. a global minimum) corresponding to stored information, and the results of operation are not trapped at a local minimum.

Another object of the present invention is to provide a radiation image processing method utilizing a neural network, wherein determination of various items, and/or a filtering process, is carried out accurately.

The radiation image processing method utilizing a neural network, in accordance with the present invention, is characterized by dividing neurons of an intermediate layer of a neural network into two groups. Image processing, with respect to the whole region of a radiation image, is carried out by one of the two groups of neurons. Image processing, with respect to parts of the region of the radiation image, is carried out by the other group of neurons.

Specifically, the present invention provides a radiation image processing method utilizing a neural network in which an image signal, representing a radiation image, is fed into a neural network, image processing is carried out on the image signal by the neural network, and an output representing the results of the image processing is obtained from the neural network, wherein the improvement comprises the steps of:

i) carrying out the image processing on said image signal, with respect to the whole region of said radiation image, by a first group of neurons of an intermediate layer of said neural network, and ii) carrying out the image processing on said image signal, with respect to parts of the region of said radiation image, by a second group of neurons of the intermediate layer of said neural network.

The term "intermediate layer", as used herein, means a layer which is located between an input layer and an output layer among a plurality of neuron layers constituting a neural network.

Also, the term "image processing", as used herein, means a filtering process, such as image emphasis or image correction, and/or determination of a subdivision pattern of radiation images, the shape and location of an irradiation field, an orientation in which an object was placed when the image of the object was recorded, a portion of an object the image of which was recorded, an abnormal pattern appearing in a radiation image, or the like.

With the radiation image processing method utilizing a neural network, in accordance with the present invention, the neurons constituting the intermediate layer of the neural network are divided into two groups. One group of neurons carry out the image processing with respect to the whole region of the radiation image, as in the conventional overall connection type of neural network. The other group of neurons carry out the image processing with respect to parts of the region of the radiation image.

In the image processing, with respect to parts of the region of the radiation image, the degree of freedom of the learning operation of the neural network is lower than in the image processing with respect to the whole region of the radiation image. Therefore, the probability that the results of the operation carried out by the neural network will be trapped at the local minimum can be kept low.

In the manner described above, a relationship between image signal components of the image signal, representing the image information at respective positions on the whole radiation image, can be found from the image processing, with respect to the whole region of the radiation image. Also, information, which is based on image signal components representing the image information, at part in the vicinity of a remark picture element in the radiation image and which is not trapped at the local minimum, can be obtained from the image processing, with respect to parts of the region of the radiation image. Therefore, the learning operation of the neural network can be carried out by considering both the relationship between the image signal components, representing the image information at respective positions on the whole radiation image, and the information, which is based on the image signal components representing the image information, at part in the vicinity of a remark picture element in the radiation image. Accordingly, it is possible to eliminate the drawbacks of the conventional neural network in that the output obtained from the neural network easily becomes trapped at the local minimum.

DESCRIPTION OF THE PREFERRED EMBODIMENTS

The present invention will hereinbelow be described in further detail with reference to the accompanying drawings. In the embodiments described below, a stimulable phosphor sheet is employed.

Figure 1:
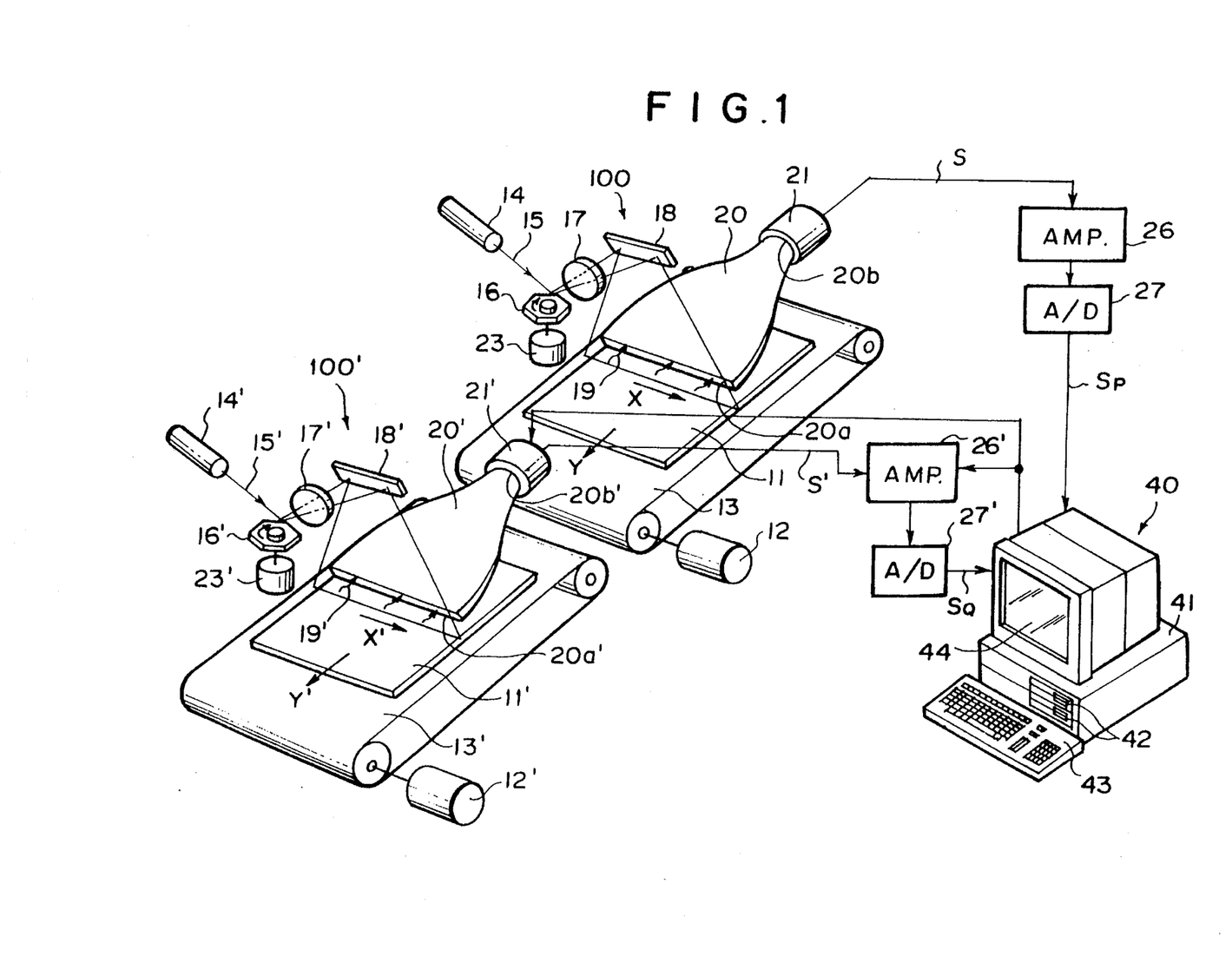
FIG. 1 is a perspective view showing an example of an X-ray image read-out apparatus and an example of a computer system, in which a radiation image processing apparatus, for carrying out an embodiment of the radiation image processing method utilizing a neural network, in accordance with the present invention, is employed.

FIG. 1 is a perspective view showing an example of an X-ray image read-out apparatus and an example of a computer system, in which a radiation image processing apparatus, for carrying out an embodiment of the radiation image processing method utilizing a neural network, in accordance with the present invention, is employed. In this embodiment, by way of example, a stimulable phosphor sheet is used, and a preliminary readout is carried out.

In an X-ray image recording apparatus (not shown), an X-ray image has been stored on a stimulable phosphor sheet 11. The stimulable phosphor sheet 11, on which the X-ray image has been stored, is placed at a predetermined position in a preliminary read-out means 100, which carries out a preliminary readout by scanning the stimulable phosphor sheet 11 with a light beam having a low energy level, thereby releasing only part of the energy from the stimulable phosphor sheet 11 on which energy was stored during its exposure to radiation. The stimulable phosphor sheet 11 is conveyed in a sub-scanning direction, indicated by the arrow Y by a sheet conveyance means 13, which is constituted of an endless belt, or the like, and which is operated by a motor 12. A laser beam 15, which has a low energy level, is produced by a laser beam source 14, and is reflected and deflected by a rotating polygon mirror 16 which is quickly rotated by a motor 23 in the direction indicated by the arrow. The laser beam 15 then passes through a converging lens 17, which may be constituted of an fθ lens or the like. The direction of the optical path of the laser beam 15 is then changed by a mirror 18, and the laser beam 15 impinges upon the stimulable phosphor sheet 11 and scans it in a main scanning direction indicated by the arrow X, the direction of which is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20 and photoelectrically detected by a photomultiplier 21. The light guide member 20 is made from a light guiding material, such as an acrylic plate, and has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside the light guide member 20, emanates from the light output face 20b, and is received by the photomultiplier 21. In this manner, the amount of the emitted light 19, the amount of which represents the X-ray image, is converted into an electric signal by the photomultiplier 21.

An analog output signal S generated by the photomultiplier 21 is logarithmically amplified by a logarithmic amplifier 26, and digitized by an A/D converter 27 into a preliminary read-out image signal SP. The preliminary read-out image signal SP takes a value proportional to the logarithmic value of the amount of the light 19, which was emitted from each of the picture elements in the X-ray image stored on the stimulable phosphor sheet 11.

In the preliminary readout, read-out conditions, i.e. the voltage applied to the photomultiplier 21 and the amplification factor of the logarithmic amplifier 26, are adjusted so that image information can be detected accurately even if the amount of energy stored on the stimulable phosphor sheet 11, during its exposure to radiation, varies over a wide range.

The preliminary read-out image signal SP, which has been obtained in the manner described above, is fed into a computer system 40. The computer system 40 is provided with a radiation image processing apparatus for carrying out an embodiment of the radiation image processing method utilizing a neural network, in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

In the computer system 40, the shape and location of an irradiation field, and other items, are determined from the preliminary read-out image signal SP. Also, a filtering process, such as emphasis of the edge of the irradiation field, is carried out on the preliminary read-out image signal SP. Thereafter, the read-out conditions for the final readout, i.e. the sensitivity and the contrast during the final readout, are determined from the preliminary read-out image signal SP. By way of example, the voltage applied to a photomultiplier 21' and the amplification factor of a logarithmic amplifier 26' are controlled in accordance with the sensitivity and the contrast, which have thus been determined.

The contrast corresponds to the ratio of the largest amount of emitted light which is capable of being accurately converted into an image signal during the final readout to the smallest amount of emitted light which is capable of being accurately converted into an image signal during the final readout. The sensitivity corresponds to the photoelectric conversion factor, which represents to which image signal level a predetermined amount of emitted light is to be converted.

A stimulable phosphor sheet 11', on which the preliminary readout has been finished, is placed at a predetermined position in the final read-out means 100' and scanned with a laser beam 15' having an energy level higher than that of the laser beam 15 used during the preliminary readout. In this manner, an image signal is detected under the read-out conditions, which have been determined on the basis of the preliminary read-out image signal SP. The configuration of the final read-out means 100' is nearly the same as that of the preliminary read-out means 100, and therefore, elements corresponding to those constituting the preliminary read-out means 100 are numbered with corresponding primed reference numerals in FIG. 1.

After the image signal is digitized in an A/D converter 27', the resulting image signal SQ is fed into the computer system 40. The computer system 40 carries out appropriate image processing, e.g., appropriate filtering processes (such as emphasis and correction) and appropriate determination of various items, on the image signal SQ. After being image processed, the image signal is fed into a reproducing apparatus (not shown), which reproduces a visible image from the image signal.

As described above, in the computer system 40, by using the neural network, the subdivision pattern of radiation images, the shape and location of an irradiation field, the orientation in which the object was placed when the image of the object was recorded, and/or the portion of the object of which an image was recorded, are determined from the preliminary read-out image signal SP. Thereafter, the read-out conditions for the final readout are determined.

Figure 2:
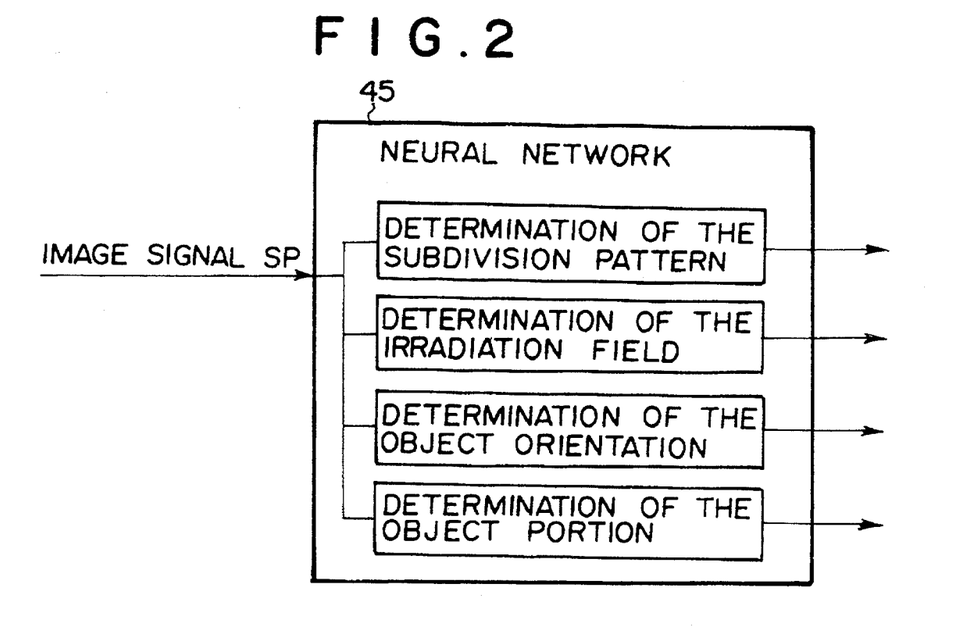
FIG. 2 is a block diagram showing an example of a neural network which carries out determination of various items in the computer system shown in FIG. 1.

As shown in FIG. 2, the preliminary read-out image signal SP is fed into a neural network 45. From the preliminary read-out image signal SP, the neural network 45 determines the subdivision pattern of radiation images, the shape and location of an irradiation field, the orientation in which the object was placed when the image of the object was recorded, and/or the portion of the object of which an image was recorded. Outputs representing the characteristic measures, which indicate the results of the determination, are thus obtained from the neural network 45.

Figure 3:
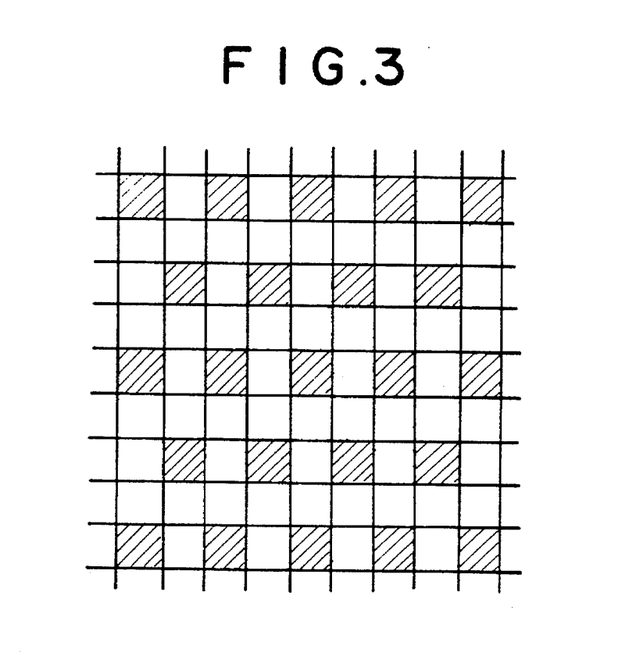
FIG. 3 is an explanatory view showing picture elements in a radiation image, which have been thinned out.

As shown in FIG. 3, only the image signal components of the preliminary read-out image signal SP, which represent the picture elements hatched in FIG. 3, may be sampled. Only the sampled image signal components may then be fed into the neural network 45. In this manner, the number of input points of the neural network 45 can be reduced. In most images, the major part of the image is present in the vicinity of the center part in the image. Therefore, the preliminary read-out image signal SP may be thinned out such that more image signal components may remain unremoved, which correspond to the center part in the image, and less image signal components may remain unremoved, which correspond to the peripheral areas in the image.

Figure 4:
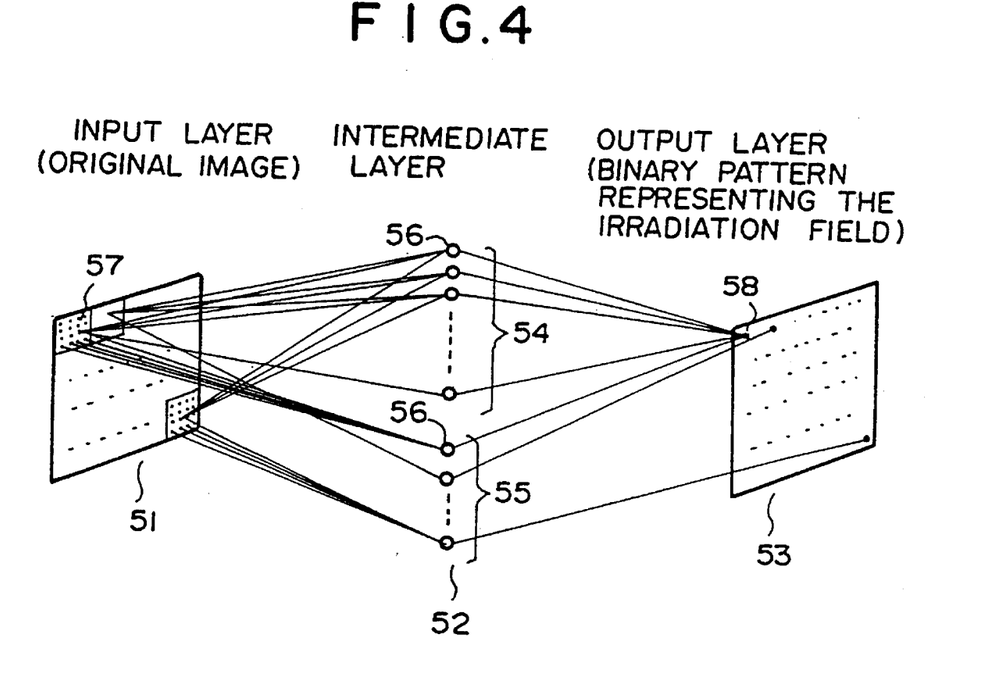
FIG. 4 is an explanatory view showing an example of how the shape and location of an irradiation field are determined by a neural network incorporated in the computer system shown in FIG. 1.

The structure of the neural network 45 will be described hereinbelow with reference to FIG. 4. The neural network 45, shown in FIG. 4, is designed to determine the shape and location of an irradiation field. The neural network 45 comprises an input layer (i.e., a first layer) 51, which corresponds to an original image, an intermediate layer (i.e., a second layer) 52, and an output layer (i.e., a third layer) 53, which corresponds to a binary pattern representing the shape and location of an irradiation field. The intermediate layer 52 is composed of a first group of neurons 54, which carry out the determination of the shape and location of an irradiation field, with respect to the whole region of the original image, and a second group of neurons 55, which carry out the determination of the shape and location of an irradiation field, with respect to parts of the region of the original image. Specifically, image signal components representing the picture elements in the whole region of the original image are fed into each of neurons 56, 56, . . . which constitute the first group of neurons 54. Also, only the image signal components representing the picture elements falling within the area inside of each of blocks 57, 57, . . . , which constitute the region of the original image, are fed into a neuron 56, which is among the neurons 56, 56, . . . constituting the second group of neurons 55 and which corresponds to each said block 57.

In FIG. 4, as an aid in facilitating the explanation, each of the neurons 56, 56, . . . of the intermediate layer 52 is connected by a single line to each of the blocks 57, 57, . . . of the original image corresponding to the input layer 51. Hence, each of the neurons 56, 56, . . . of the intermediate layer 52 is connected to the neurons of the input layer 51, each of which corresponds to one of all picture elements falling in the area inside of each of the blocks 57, 57, . . . of the original image.

How the learning operation of a neural network is repeated and how an accurate image processing is carried out by the neural network will be described hereinbelow.

How the learning operation with respect to the whole region of the image, in which the first group of neurons 54 are utilized, is carried out and how the learning operation with respect to parts of the region of the image, in which the second group of neurons 55 are utilized, is carried out will be described hereinbelow.

First, how the learning operation, in which the first group of neurons 54 are utilized, is carried out will be described hereinbelow by taking the determination of the shape and location of an irradiation field as an example.

Figure 5:
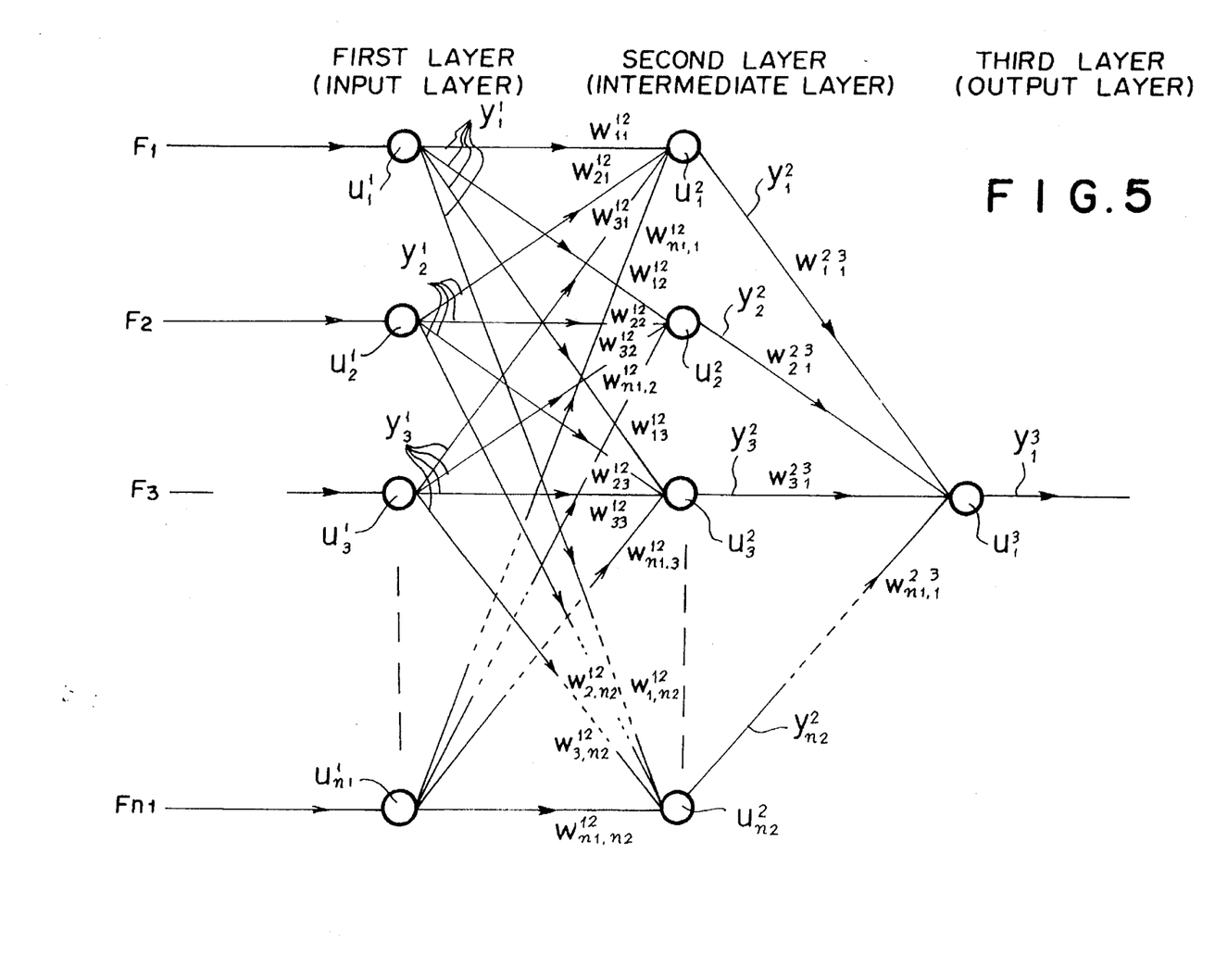
FIG. 5 is an explanatory view showing an example of a neural network.

FIG. 5 is an explanatory view showing an example of the neural network which is provided with a learning function by a back propagation method. As described above, the term "learning function by a back propagation method", as used herein, means the learning algorithms in a neural network, with which the output of the neural network is compared with a correct answer (an instructor signal), and the weights of connections (i.e. the weights of synapse connections) are corrected sequentially from the output side to the input side of the neural network.

A radiation image signal has been detected from an image, on which the edge of an irradiation field is sharp and the region outside of the irradiation field is not affected by the scattered radiation. For example, an image signal, from which the shape and location of an irradiation field could be determined accurately, is prepared. Such an image signal is employed as the instructor signal.

With reference to FIG. 5, the neural network comprises a first layer (i.e., an input layer), a second layer (i.e., an intermediate layer), and a third layer (i.e., an output layer). The first, second, and third layers are composed respectively of n1 number of units, n2 number of units, and a single unit. Signals F1, F2, . . . , Fn1, which are fed into the first layer (i.e., the input layer), are the image signal components of the preliminary read-out image signal SP representing the X-ray image. The preliminary read-out image signal has been thinned out in the manner described above, with reference to FIG. 2, and only the image signal components of the preliminary read-out image signal SP, representing the picture elements in the X-ray image which remain unremoved, are fed into the first layer. An output $y_1^3$ obtained from the third layer (i.e., the output layer) is the signal representing the shape and location of the irradiation field (a circular irradiation field, a rectangular irradiation field, or the like).

An i'th unit of a k'th layer is indicated by $u_i^k$. The total input into the unit $u_i^k$ is indicated by $x_i^k$, and the total output therefrom is indicated by $y_i^k$. The weight of connection from the unit $u_i^k$ to a unit $u_j^{k+1}$ is indicated by $W_{ij}^{kk+1}$. Also, each unit $u_j^k$ has the same characteristic function, which is expressed as $$f(x) = \frac{1}{1-e^x} \quad (1)$$

The input $x_j^k$ into each unit $u_j^k$ and the output $y_j^k$ therefrom are expressed as $$x_j^k = \sum_i W_i^{k-1\,k} \cdot y_i^{k-1} \quad (2)$$

$$y_j^k = f(x_j^k) \quad (3)$$

Inputs F1, F2, . . . , Fn1 into the units $u_i^1$, where i=1, 2, . . . , n1, which constitute the input layer, are fed into the units $u_i^1$, where i=1, 2, . . . , n1, without being weighted. The n1 number of signals F1, F2, . . . , Fn1 are weighted with the weights of connections $W_{ij}^{kk+1}$, and transmitted to the ultimate output $Y_1^3$. In this manner, a binary pattern signal representing the shape and location of the irradiation field is obtained.

How the weights of connections $W_{ij}^{kk+1}$ are determined will be described hereinbelow. First, initial values of the weights of connection $W_{ij}^{kk+1}$ are given by random numbers. The range of the random numbers should preferably be limited such that, even when the values of the inputs F1, F2, . . . , Fn1 fluctuate to the largest extent, the output $y_1^3$ may take a value falling within a predetermined range or a value close to said predetermined range.

Preliminary read-out image signals SP, SP, . . . are obtained from a plurality of stimulable phosphor sheets storing X-ray images, on which the shapes and locations of irradiation fields are known. Each of the preliminary read-out image signals SP, SP, . . . is then thinned out. In this manner, the n1 number of inputs F1, F2, . . . , Fn1 are obtained. The n1 number of inputs F1, F2, . . . , Fn1 are fed into the neural network shown in FIG. 5, and the outputs $y_i^k$ of the respective units $u_i^k$ are monitored.

After the outputs $y_i^k$ are obtained, a square error E between the ultimate output $y_1^3$ and the instructor signal, d, representing the correct shape and location of the irradiation field on the X-ray image is calculated with the formula $$E = \tfrac{1}{2}(y_1^3 - d)^2 \quad (4)$$

The weights of connections $W_{ij}^{kk+1}$ are then corrected such that the square error E becomes the smallest.

The square error E is a function of $W_{ij}^{kk+1}$. Therefore, in order for the square error E to be minimized, the weights of connection $W_{ij}^{kk+1}$ are corrected with the formula $$W_{ij}^{kk+1} = W_{ij}^{kk+1} - \eta \cdot \frac{\partial E}{\partial W_{ij}^{kk+1}} \quad (5)$$

where η denotes a coefficient, which is referred to as a learning coefficient.

The following formula obtains:

$$\frac{\partial E}{\partial W_{ij}^{kk+1}} = \frac{\partial E}{\partial x_j^{k+1}} \cdot \frac{\partial x_j^{k+1}}{\partial W_{ij}^{kk+1}} \quad (6)$$

$$x_j^{k+1} = \sum_i W_{ij}^{kk+1} \cdot y_i^k \quad (7)$$

Therefore, Formula (6) gives $$\frac{\partial E}{\partial W_{ij}^{kk+1}} = \frac{\partial E}{\partial x_j^{k+1}} \cdot y_i^k \quad (8)$$

From Formula (4), the following formula obtains:

$$\frac{\partial E}{\partial x_1^3} = (y_1^3 - d) \cdot \frac{\partial E_1^3}{\partial x_1^3} \quad (9)$$

Formula (9) can be changed with Formula (3) into $$\frac{\partial E}{\partial x_1^3} = (y_1^3 - d) \cdot f'(x_1^3) \quad (10)$$

From Formula (1), the following formula obtains:

$$f'(x) = f(x)(1 - f(x)) \quad (11)$$

Therefore, $$f'(x_1^3) = y_1^3 \cdot (1 - y_1^3) \tag{12}$$

Setting k=2 in Formula (8) and substituting Formulas (10) and (11) into Formula (8) yield $$\frac{\partial E}{\partial W_{i1}^{23}} = \frac{\partial E}{\partial x_1^3} \cdot y_i^2 \tag{13}$$

$$= (y_1^3 - d) \cdot y_1^3 \cdot (1 - y_1^3) \cdot y_i^2$$

Substitution of Formula (13) into Formula (5) yields $$W_{i1}^{23} = W_{i1}^{23} - \eta \cdot (y_1^3 - d) \cdot y_1^3 \cdot (1 - y_1^3) \cdot y_i^2 \tag{14}$$

The weights of connections $W_{i1}^{23}$, where $i=1, 2, \ldots, n1$, are corrected with Formula (14).

Also, the following formula obtains:

$$\frac{\partial E}{\partial x_j^2} = \frac{\partial E}{\partial x_1^3} \cdot \frac{\partial x_1^3}{\partial x_j^2} \tag{15}$$

Substitution of Formulas (2) and (3) into Formula (15) yields $$\frac{\partial E}{\partial x_j^2} = \frac{\partial E}{\partial x_1^3} \cdot \frac{\partial}{\partial x_j^2} \left( \sum_j W_{j\,1}^{2\,3} \cdot y_j^2 \right) \tag{16}$$

$$= \frac{\partial E}{\partial x_1^3} \cdot W_{j\,1}^{2\,3} \cdot f'(x_j^2)$$

Formula (11) gives $$f'(x_j^2) = y_j^2 \cdot (1 - y_j^2) \tag{17}$$

Substitution of Formulas (10), (12), and (17) into Formula (16) yields $$\frac{\partial E}{\partial x_j^2} = (y_1^3 - d) \cdot y_1^3 \cdot (1 - y_1^3) \cdot y_j^2 \cdot (1 - y_j^2) \cdot W_{j\,1}^{2\,3} \tag{18}$$

Setting k=1 in Formula (8) and substituting Formula (18) into Formula (8) yield $$\frac{\partial E}{\partial W_{i\,j}^{1\,2}} = \frac{\partial E}{\partial x_j^2} \cdot y_i^1 \tag{19}$$

$$= (y_1^3 - d) \cdot y_1^3 \cdot (1 - y_1^3) \cdot y_j^2 \cdot (1 - y_j^2) \cdot W_{j\,1}^{2\,3} \cdot y_i^1$$

Substitution of Formula (19) into Formula (5) and setting of k=1 yield $$W_{ij}^{12} = W_{ij}^{12} - \eta \cdot (y_1^3 - d) \cdot y_1^3 \cdot (1 - y_1^3) \cdot y_j^2 \cdot (1 - y_j^2) \cdot y_i^1 \cdot W_{j1}^{23} \tag{20}$$

The values of the weights of connections $W_{i1}^{23}$, where $i=1, 2, \ldots, n1$, which have been corrected with Formula (14), are substituted into Formula (20). In this manner, the weights of connections $W_{ij}^{12}$, where $i=1, 2, \ldots, n1$ and $j=1, 2, \ldots, n2$, are corrected.

Theoretically, the weights of connection $W_{ij}^{kk+1}$ can be converged to predetermined values by using Formulas (14) and (20), using a sufficiently small learning coefficient η, and carrying out the learning operations many times. However, if a sufficiently small learning coefficient η is used, the speed with which the learning operations are effected will become low. If a very large learning coefficient η is used, "vibration" will occur in the learning operations (i.e. the weights of connections do not converge to predetermined values). Hence, the vibration is prevented by employing an inertia term, which is expressed in Formula (21), in the calculations of the correction amounts for the weights of connections, and the learning coefficient η is set to a slightly large value.

$$\Delta W_{ij}^{k\,k+1}(t+1) = \alpha \cdot \Delta W_{ij}^{k\,k+1}(t) + \eta \cdot \frac{\partial E}{\partial x_j^{k+1}} \cdot y_i^k \tag{21}$$

where α denotes the coefficient referred to as the inertia term, and $\Delta W_{ij}^{kk+1}$ (t) denotes the correction amount, which is used during the t'th learning operation and which is obtained by subtracting a weight of connection $W_{ij}^{kk+1}$, which has not been corrected, from a weight of connection $W_{ij}^{kk+1}$, which has been corrected (Such an inertia term is described in, for example, "Learning internal representations by error propagation In Parallel Distributed Processing" by D. E. Rumelhart, G. E. Hinton and R. J. Williams, Volume 1, J. L. McClell and, D. E. Rumelhart and The PDP Research Group, MIT Press, 1986b.)

By way of example, the inertia term α is set to 0.9, the learning coefficient η is set to 0.25, and 200,000 times of corrections (learning operations) are carried out for each of the weights of connections $W_{ij}^{kk+1}$. Thereafter, each of the weights of connection $W_{ij}^{kk+1}$ is fixed at a final value. At the time at which the learning operations are completed, the output $y_1^3$ accurately represents the shape and location of the irradiation field.

In cases where the aforesaid signal representing the shape and location of the irradiation field represents, for example, only whether the irradiation field is circular or rectangular, one of the two outputs may represent 1 (for the circular irradiation field) or 0 (for the rectangular irradiation field). In such cases, the determination can be carried out very easily by the neural network.

Also, for the portion of the object of which the image was recorded, several portions of the object of which the images are expected to be recorded, may be represented by numerals. In this manner, the determination can be carried out very easily by the neural network.

After the learning operations are completed, a preliminary read-out image signal SP representing an X-ray image, for which the shape and location of the irradiation field are unknown, is obtained. The preliminary read-out image signal SP is fed into the neural network shown in FIG. 4 The output $y_1^3$ obtained from the neural network is utilized as the signal representing the binary pattern, which indicates the shape and location of the irradiation field in the X-ray image. Because the learning operations have been carried out in the manner described above, the signal thus obtained accurately represents the shape and location of the irradiation field. In particular, the location of a remark picture element in the whole image can thus be found accurately.

However, in cases where only the learning operations, with respect to the whole region of the original image, are carried out in the manner described above, the degree of freedom of the learning operation is high. Therefore, in such cases, depending on the set values of the initial conditions, the output of the neural network becomes trapped at the local minimum.

In order to prevent the problems from occurring in which the output of the neural network becomes trapped at the local minimum, the learning operations, in which the second group of neurons 55 are utilized, are carried out simultaneously.

Only the image signal components representing the picture elements falling within the area inside of each of the blocks 57, 57, . . . , which constitute the region of the original image, are fed into a neuron 56, which is among the neurons 56, 56, . . . constituting the second group of neurons 55 and which corresponds to each said block 57. Specifically, in cases where the region of the original image is divided into P number of blocks 57, 57, . . ., at least P number of neurons 56, 56, . . . are necessary as the second group of neurons 55.

An output signal corresponding to a single picture element in the binary pattern representing the shape and location of the irradiation field is obtained from each of the neurons 56, 56, . . . constituting the second group of neurons 55 (single connection). The corresponding neuron of the output layer 53 receives the output signal and feeds it out directly.

Specifically, the part of the neural network, which carries out the determination of the shape and location of an irradiation field, with respect to parts of the region of the original image, is composed of a number of neural nets where the number is equal to the number of the blocks 57, 57, . . . of the original image. Each of these neural nets is composed of an input layer (i.e., a first layer) 51, which is constituted of n1 number of units, an intermediate layer (i.e., a second layer) 52, which is constituted of a single unit, and an output layer (i.e., a third layer) 53, which is constituted of a single unit.

In the same manner as that described above for the part of the neural network, which carries out the determination of the shape and location of an irradiation field, with respect to the whole region of the original image, the input fed into each of the neural nets and the output obtained therefrom can be represented by the formulas described above.

As described above, when the learning operations are completed, the image signal components, representing the picture elements in the whole region of the original image, are fed into each of the neurons 56, 56, . . . constituting the first group of neurons 54, where the learning operations are carried out with respect to the whole region of the original image. On the other hand, only the image signal components representing the picture elements falling within the area inside of each of blocks 57, 57, . . . are fed into a neuron 56, which is among the neurons 56, 56, . . . constituting the second group of neurons 55 and which corresponds to each said block 57. The learning operations of the second group of neurons 55 are carried out with respect to parts of the region of the original image.

Also, in the part of the neural network working with respect to the whole region of the original image, in order to yield an output signal corresponding to a single picture element 58 in the binary pattern, representing the shape and location of the irradiation field, weighted operations are carried out on the output signals obtained from all of the neurons 56, 56, . . . constituting the first group of neurons 54. On the other hand, in the part of the neural network working with respect to parts of the region of the original image, the output signal obtained from a single neuron 56 among the neurons 56, 56, . . ., constituting the second group of neurons 55, is directly utilized as an output signal corresponding to a single picture element 58 in the binary pattern representing the shape and location of the irradiation field.

Therefore, the part of the neural network working with respect to parts of the region of the original image is not suitable for investigating the relationship between the image signal components representing the image information at respective positions on the whole original image. However, the part of the neural network working with respect to parts of the region of the original image is advantageous in that the degree of freedom of the learning operations is lower than in the part of the neural network working with respect to the whole region of the original image, and therefore the obtained output is not easily trapped at the local minimum.

Therefore, the part of the neural network working with respect to parts of the region of the original image has the checking function for preventing the output of the part of the neural network working with respect to the whole region of the original image from being trapped at the local minimum.

The number of layers of the neural network is not limited to three, and the neural network may be constituted of more layers. Also, no limitation is imposed on the number of the units of each layer. The number of the units of each layer may be selected in accordance with the number of the picture elements represented by the preliminary read-out image signal SP, which is fed into the neural network, the accuracy, with which the shape and location of the irradiation field are to be determined, or the like.

By way of example, the voltage applied to the photomultiplier 27', the amplification factor of the amplifier 26' of the final read-out means 100', or the like, is controlled in accordance with the signal, which has been obtained from the neural network and which accurately represents the shape and location of the irradiation field. The final readout is carried out under the controlled conditions.

In the embodiment described above, the neural network, which is composed of the two parts working with respect to the whole region of the original image and with respect to parts of the region of the original image, is utilized to generate a binary pattern signal representing the shape and location of the irradiation field. Alternatively, the neural network may be utilized to carry out a filtering process as preliminary image processing, which facilitates the determination of the shape and location of the irradiation field. In such cases, a signal representing a transformed picture element, which is obtained from density transformation, or the like, is obtained as an output for each picture element in the original image.

Figure 6:
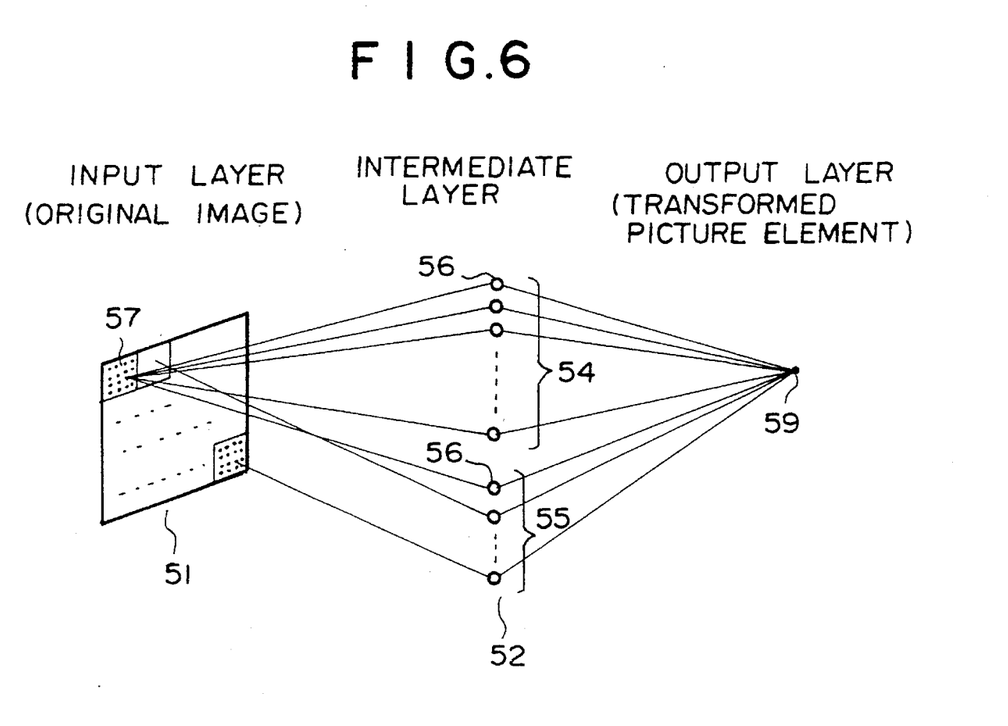
FIG. 6 is an explanatory view showing an example of how a filtering process is carried out by the neural network incorporated in the computer system shown in FIG. 1 before the shape and location of an irradiation field are determined.

FIG. 6 shows an embodiment, wherein a neural network is utilized for carrying out a filtering process as preliminary image processing, and an output representing a transformed picture element is obtained.

The neural network employed in this embodiment is approximately identical with the neural network employed in the aforesaid embodiment for generating a binary pattern signal representing the shape and location of the irradiation field. In the aforesaid embodiment for generating a binary pattern signal representing the shape and location of the irradiation field, each of the neurons 56, 56, . . ., constituting the second group of neurons 55, is connected in the single connection mode to each neuron of the output layer. On the other hand, in the embodiment of FIG. 6 for generating an output representing a transformed picture element, all of the neurons 56, 56, . . ., constituting the second group of neurons 55, are connected in the overall connection mode to a neuron 59 of the output layer.

In this embodiment, the part of the neural network working with respect to parts of the region of the original image has the function of preventing the output value from being trapped at the local minimum. Therefore, an output, which represents a transformed picture element and which is not trapped at the local minimum, can be obtained. From the transformed picture element, the shape and location of the neural network can be determined easily.

In the two embodiments described above, the shape and location of the irradiation field are determined by the neural network. The subdivision pattern of radiation images, the orientation in which the object was placed when the image of the object was recorded, the portion of the object of which the image was recorded, or the like, can also be determined by the neural network in the same manner as that described above. In such cases, a signal representing the subdivision pattern, the orientation in which the object was placed when the image of the object was recorded, the portion of the object of which the image was recorded, or the like, is obtained as the output.

Also, in the two embodiments described above, the preliminary read-out image signal SP is fed into the neural network, and an output is generated, which represents the binary pattern indicating the shape and location of the irradiation field or which represents the transformed picture element such that the shape and location of the neural network can be determined easily. Alternatively, a final read-out image signal SQ may be fed into the neural network, having the structure shown in FIG. 4 or FIG. 6, and an output signal, representing an ultimate image and which is easy to diagnose, may be generated by the neural network from the final read-out image signal SQ.

Specifically, in such cases, the neural network carries out an image filtering process for forming the ultimate image, which is easy to diagnose, and generates an image signal resulting from image processing, such as normalization and/or emphasis, correction, and other processes.

In such cases, the part of the neural network working with respect to parts of the region of the original image has the function of preventing the output value of the whole neural network from being trapped at the local minimum. Therefore, an output image signal, which is reliable and which is not trapped at the local minimum, can be obtained.

In the radiation image processing method utilizing a neural network, in accordance with the present invention, the number of the neurons constituting the first group of neurons 54 and the number of the neurons constituting the second group of neurons 55 in the intermediate layer of the neural network may be selected from appropriate values by considering the number of picture elements in the original image, the purposes for which the output signal is used, or the like.

In the aforesaid embodiments, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary readout and the final readout. In this case, after being subjected to the preliminary readout, the stimulable phosphor sheet 11 may be moved back to the position at which the image readout was started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above, for example, a laser beam source or the like may change the intensity of the light beam.

Also, in the aforesaid embodiments, the read-out conditions for the final readout are adjusted by the computer system 40. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

Additionally, the aforesaid embodiments are applied to the radiation image read-out apparatus wherein the preliminary readout is carried out. However, the radiation image processing method utilizing a neural network, in accordance with the present invention, is also applicable to radiation image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by the computer system 40. The image signal is then processed under the calculated image processing conditions.

The radiation image processing method utilizing a neural network, in accordance with the present invention, is further applicable when radiation images are read out from stimulable phosphor sheets and when X-ray images are detected from sheets of X-ray film.

What is claimed is:

1. A radiation image processing method utilizing a neural network, in which an image signal, representing a radiation image, is fed into a neural network, image processing is carried out on the image signal by the neural network, an output, representing the results of the image processing, is obtained from the neural network;

wherein the improvement comprises the steps of:
   (i) providing the neural network with: 1) an input layer of neurons, said input layer of neurons being made up of clusters of neurons, each of said clusters of neurons corresponding to a different part of the radiation image, 2) an intermediate layer of neurons, said intermediate layer of neurons being made up of a first group of neurons and a second group of neurons, and 3) an output layer of neurons;
   (ii) carrying out the image processing on said image signal, with respect to the whole region of said radiation image, using the first group of neurons of the intermediate layer of said neural network, each of said first group of neurons being connected to each of the neurons of the input layer, and
   (iii) carrying out the image processing on said image signal, with respect to parts of the region of said radiation image, using the second group of neurons of the intermediate layer of said neural network, each of the second group of neurons being connected to each of the neurons of one of said clusters,
   iv combining results of the image processing carried out in steps ii and iii above to obtain the output representing the results of the image processing.

2. A method as defined in claim 1 wherein said image processing is a filtering process.

3. A method as defined in claim 1 wherein said image processing is one of the determination of a subdivision pattern of radiation images, the shape and location of an irradiation field, an orientation in which an object was placed when the image of the object was recorded, a portion of an object of which the image was recorded, and an abnormal pattern appearing in a radiation image.

4. A method as defined in claim 1 wherein said radiation image has been stored on a stimulable phosphor sheet.

5. A method as defined in claim 4 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

6. A method as defined in claim 5 wherein said stimulating rays are a laser beam.

7. A method as defined in claim 1 wherein said radiation image has been recorded on photographic film.

* * * * *